United States Patent [19]
Silk

[11] 4,296,737
[45] Oct. 27, 1981

[54] PARABOLIC TROUGH CONCENTRATING SOLAR COLLECTOR

[75] Inventor: John K. Silk, Wellesley, Mass.

[73] Assignee: American Science and Engineering, Inc., Cambridge, Mass.

[21] Appl. No.: 100,612

[22] Filed: Dec. 5, 1979

[51] Int. Cl.³ .............................................. F24J 3/02
[52] U.S. Cl. ................................. 126/438; 126/425; 126/439; 126/451; 126/424
[58] Field of Search .............. 126/438, 439, 424, 425, 126/451; 353/3

[56] References Cited

U.S. PATENT DOCUMENTS

| | | | |
|---|---|---|---|
| 1,661,473 | 3/1928 | Goddard et al. | 126/439 |
| 3,991,740 | 11/1976 | Rabl | 126/438 |
| 4,132,219 | 1/1979 | Cohen et al. | 126/438 |
| 4,142,510 | 3/1979 | Hare et al. | 126/438 |
| 4,195,775 | 4/1980 | Pitts | 126/438 X |
| 4,217,884 | 8/1980 | Strong | 126/425 X |
| 4,222,368 | 9/1980 | Rost et al. | 126/438 |

Primary Examiner—Larry Jones
Attorney, Agent, or Firm—Pollock, Vande Sande & Priddy

[57] ABSTRACT

A concentrating solar collector includes a radiation reflective surface having the configuration of a paraboloid of translation, the axial extent of the paraboloid being the portion between the apex and the plane perpendicular to the axis and passing through the focus. A receiver of reflected radiant energy is located along the focal line of the paraboloid, and includes a receiver entrance aperture whose plane is oriented at an angle to the axis, preferably at an angle of 29°±10°. The width of the entrance aperture is a function of the distance between the lip and axis of the parabola and the angular radius of the sun.

11 Claims, 9 Drawing Figures

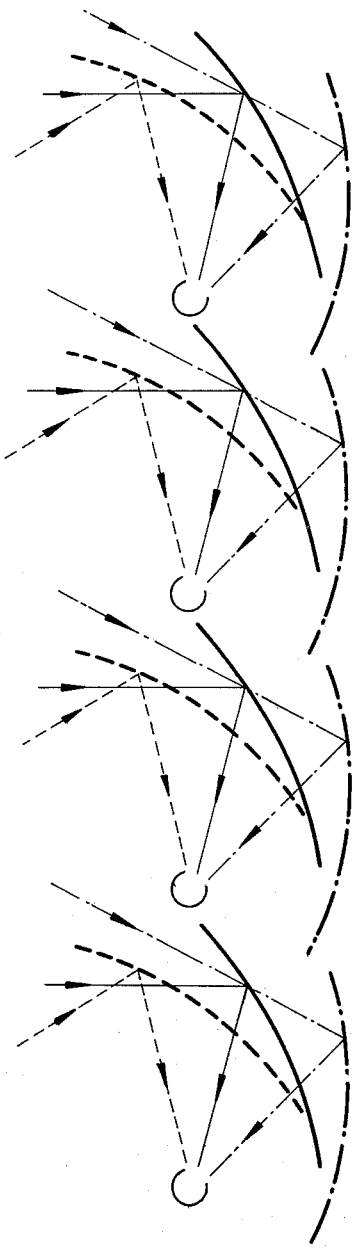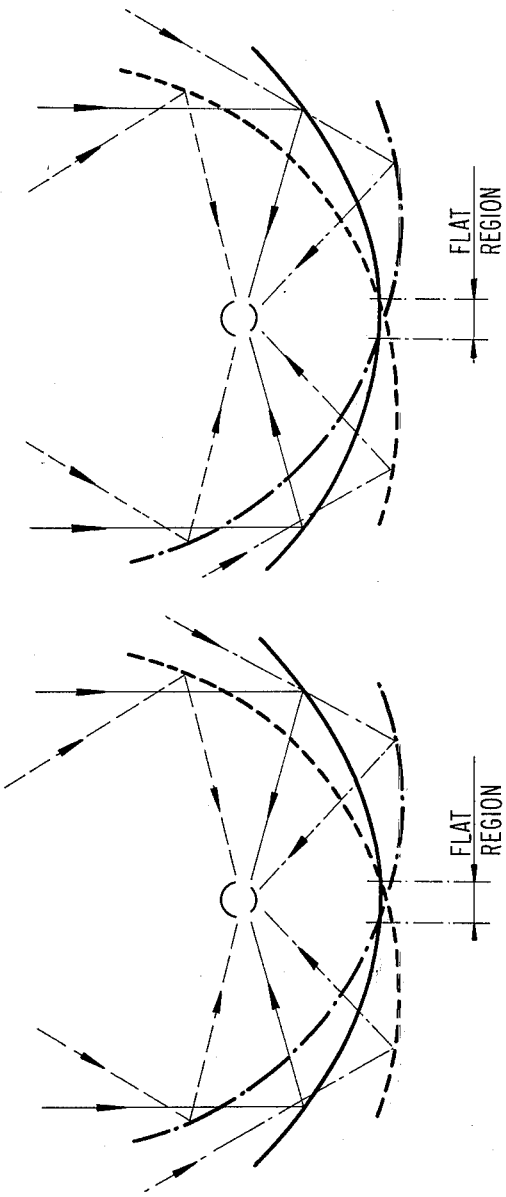
FIG.8(a)
FIG.8(b)

PARABOLIC TROUGH CONCENTRATING SOLAR COLLECTOR

BACKGROUND OF THE INVENTION

The present invention relates to an improved parabolic trough concentrating solar collector whose optical design is optimized to maximize the concentration ratio and collection efficiency. The collector, which is intended for use in a solar tracking mode, has a geometry that facilitates fabrication and is insensitive to manufacturing imperfections. The use of the high concentration ratio collector of the present invention permits a working fluid to be heated to a higher temperature than is possible with a comparable collector of low concentration ratio, and its ease of fabrication and insensitivity to fabrication errors reduces manufacturing costs and increases reliability.

In recent years, the rising interest in solar energy has stimulated a substantial effort in the design of effective solar collectors. The simplest devices intercept incident solar radiation without concentration, for example flat plate collectors. With nonconcentrating devices, a working fluid can be heated up to e.g., 90° C. While such a temperature is useful in certain applications, for example domestic hot water systems, it has low thermodynamic efficiency for processes depending upon a heat engine since large temperature differences are not possible. Furthermore, industrial process heat applications often require higher temperatures.

A variety of concentrating collectors have been designed and built whose objective is to increase the solar power density incident on the absorber to permit higher operating temperatures. Among the concentrating collectors suggested heretofore are compound parabolic collectors (Winston collector), Fresnel lenses, concentrating paraboloids, inflated tube concentrating collectors, and faceted fixed mirror collectors. The concentration ratios vary from 2X to over 100X. In some cases the collectors track the daily motion of the sun across the sky and in other cases the collector positions are adjusted less frequently, e.g., with a period of weeks. There is no consensus in the solar energy field on the question of which is the "best" type of collector. The performance varies with the design and so does the cost of fabrication/installation/maintenance. Recent approaches are summarized in the proceedings of 3rd Annual Solar Heating and Cooling Research and Development Branch Contractors Meeting, Sept. 24–27, 1978, U.S. Department of Energy Report CONF-780983, March, 1979.

A parabolic trough concentrating solar collector consists of an image forming optic which is a paraboloid of translation, and a receiver or absorber located at the focal line of the paraboloid. One such arrangement, comprising a tracking parabolic trough reflector developed heretofore, is described in Antrim et al "A Parabolic Solar Reflector For Accurate And Economic Producibility", Proceedings of the Society of Photo-Optical Instrumentation Engineers, Vol. 161, p. 36 (1978), and operates in the manner to be discussed hereinafter in reference to FIG. 1 of the drawings herein. The tracking system is used to point the paraboloid at the sun so that the direct rays of sunlight are parallel to its axis. A mirror surface is manufactured, by one of several methods, and conforms to a portion of the mathematical paraboloid surface. The rays from the sun strike the paraboloid mirror and are reflected toward the receiver at the focus of the paraboloid. The concentration ratio is 12X (the theoretical limit is 67X). A single collector of this type is capable of achieving a 200° C. stagnation temperature and an efficiency up to 60%, and the collectors can be disposed in a modular array consisting of, for example, eighteen such collectors.

The present invention may, if desired, make use of certain auxiliary features of the system described above, such as the tracking system, the fabrication method, and the absorber design. However the present invention employs basically different collector and absorber configurations whereby the collector has maximum concentration ratio under the condition that no rays, from reflections at any point on the paraboloidal surface, are lost, and whereby the configuration of the paraboloidal reflector is such that its performance is insensitive to manufacturing imperfections.

SUMMARY OF THE INVENTION

The present invention is characterized by an optimized optical design for a parabolic trough concentrating solar collector. Two features of the design are optimized, i.e., (a) the configuration of the parabolic trough is chosen for maximum concentration ratio, and (b) the orientation of the receiver aperture is chosen for maximum efficiency. The optimization process results in a collector configuration which is convenient for fabrication, and which is insensitive to fabrication errors.

The foregoing optimizations are characterized by limiting the axial extent of the paraboloid to that portion of the prior art paraboloid which is disposed between the apex of the paraboloid and a plane perpendicular to the axis and passing through the focus. In addition, the receiver entrance aperture is rotated so that a normal to the plane of the aperture makes an angle which falls within the range 20°–40°, the best angle being 29°, with respect to the normal to the axis; and the width of the entrance aperture in the receiver is made substantially equal to 2.28 $y_0$ tan a, where $y_0$ is the distance from the lip of the parabola to the axis, and a is the angular radius of the sun. The basis for these parameters will be discussed. In effect, they optimize the collector configuration by truncating the paraboloidal mirror at the plane through its focus, by rotating the entrance aperture of the receiver from a position along the axis of the paraboloid to a position which is at an angle to said axis, and by enlarging the width of the entrance aperture within limits.

The optimized parabolic trough can be utilized in the form of a half paraboloid; or they can be employed in a two-sided paraboloidal configuration wherein pairs of half paraboloids having the configuration described are joined to one another adjacent their respective apices by an intervening flat region which has a width substantially equal to the diameter of the receiver.

BRIEF DESCRIPTION OF THE DRAWINGS

The foregoing objects, advantages, construction and operation of the present invention will become more readily apparent from the following description and accompanying drawings wherein:

FIGS. 8a and 8b schematically depict geometric arrangements of solar tracking collector arrays employing optimized parabolic trough solar concentrators constructed in accordance with the present invention, FIG. 8a depicting such an array utilizing half paraboloids, and FIG. 8b depicting such an array employing two-sided paraboloids.

DESCRIPTION OF THE PREFERRED EMBODIMENTS

Figure 1:
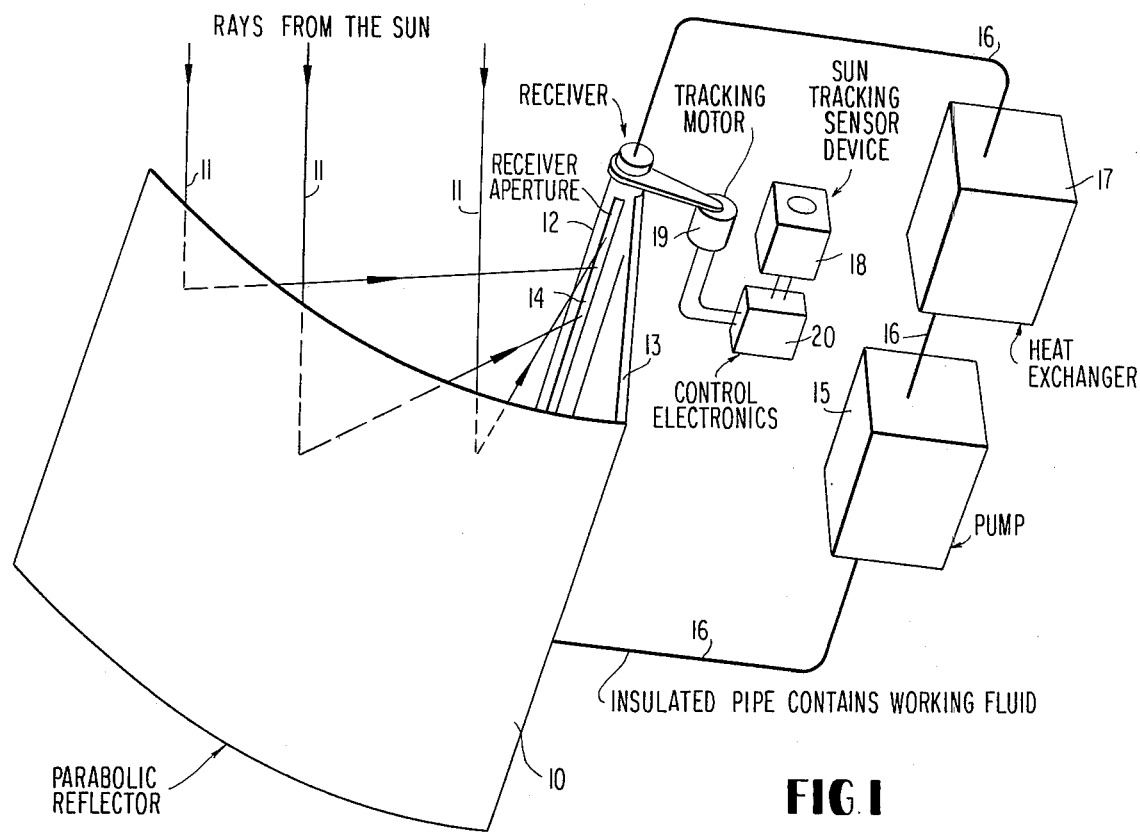
FIG. 1 is a schematic diagram of a solar energy system employing the optimized collector of the present invention.

Referring initially to FIG. 1, a solar energy system of the type contemplated by the present invention comprises a parabolic reflector 10 having an optimized configuration such as will be described hereinafter. The reflector 10 constitutes a radiation reflective surface or mirror having the configuration of a paraboloid of translation which faces the sun to intercept solar rays 11 for reflection toward a receiver 12 which is supported along the focal line of the parabolic reflector by a support structure 13 attached to said reflector substantially at its apex. The receiver 12 includes an elongated entrance aperture 14 extending along the focal line of the reflector 10, for the admission of solar energy reflected from the surface 10 whereby a working fluid disposed within the receiver can be heated. The working fluid is circulated through the receiver by means of a pump 15 which is connected into the system by insulated pipes 16, and energy is extracted from the circulating working fluid by means of a heat exchanger 17. The receiver 12 and reflector 10, being interconnected to one another, move together to track the diurnal motion of the sun under the control of a sun tracking sensor device 18 which is electrically connected to a tracking motor 19 through control electronics 20, to cause the parabolic reflector and its associated receiver to rotate about an axis which is substantially coincident with the focal line of the parabolic reflector 10.

The present invention is primarily concerned with the configuration of parabolic reflector 10 and, more particularly, is concerned with the provision of an optimized optical design for a parabolic trough concentrating solar collector. In order that the improvements of the present invention can be more readily understood, reference will be made initially to a prior art arrangement which is schematically depicted in FIG. 2.

Figure 2:
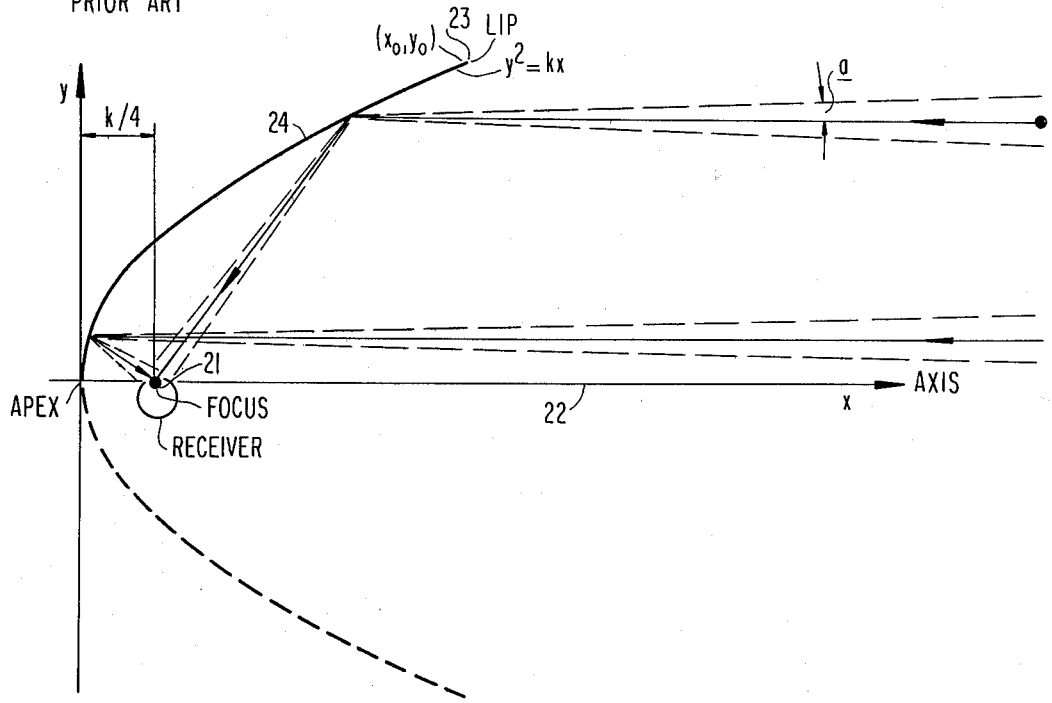
FIG. 2 is a schematic diagram of a standard parabolic trough concentrating solar collector of the type utilized in the prior art.

In the coordinate system shown in FIG. 2, the equation of the paraboloid is:

$$y^2 = kx$$

where k is a constant and the focus is at (k/4, 0), as shown. An elongated receiver 21 is disposed along the focal line of the paraboloid (i.e., along a line perpendicular to the plane of the drawing FIG. 2), and the receiver includes an entrance aperture which, in the prior art, typically lies in a plane that is perpendicular to the axis 22 of the paraboloid.

From a simple calculation it can be found that the width $W_0$ of the line image of the sun formed by rays reflected at the point $(x_0, y_0)$ at the front (sun-facing) lip of the parabolic trough is given by:

$$W_o = 2y_o(\tan a)(4S^2 + 1)/4S$$

where a is the angular radius of the sun (approximately ¼ degree) and S is a dimensionless parameter, $S = y_o/k$. Changing $y_o$ (i.e., the distance between the lip 23 of the paraboloid and its axis 22) with k fixed corresponds to using a mirror that embodies different zones of the same mathematical paraboloid. Changing k with fixed $y_o$ corresponds to using different paraboloids with the same entrance aperture. $W_o$ gives the size of the solar image when it is observed in a plane which is orthogonal to the central ray (i.e., the ray from the center of the sun) and passes through the focal line. For different values of $y_o$, such a plane rotates about the focal line.

In accordance with the present invention, a first optimization of the optical design of the paraboloid relates to the concentration ratio for rays such as those treated above, i.e., those reflected at the input aperture of the mirror. The concentration ratio is defined as the ratio of the net collecting aperture to the area of the receiver 21 or absorber aperture. For the optimizing calculation, the receiver aperture is taken to be the same size as the image of the solar disk, thus neglecting errors in the mirror surface. Since perfect fabrication of the paraboloid surface is not possible, the calculation represents a limiting case. Optimizing the theoretical limit optimizes the practical performance.

For a receiver aperture of size $W_o$, given above, the concentration ratio, CR, is given by:

$$CR = 4S/(2(4S^2 + 1) \tan a)$$

Since a is a fixed angle, the collection ratio depends only on the dimensionless parameter S. It has maximum value when $S = \frac{1}{2}$ and that value is:

$$CR_{MAX} = 1/(2 \tan a)$$

When $a = \frac{1}{4}$ degree, $CR_{MAX}$ is 114.

When $S = \frac{1}{2}$, $y_o = k/2$ and, from the equation for the paraboloid, $x_o = k/4$. Thus setting $S = \frac{1}{2}$ corresponds to using a mirror that extends from the apex of the paraboloid to the plane passing through the focus of the paraboloid and orthogonal to the optic axis, like the half-paraboloid shown in FIG. 3. The paraboloid of FIG. 3, which includes the first optimization of the present invention, is thus optimum in the sense that the collecting ratio for rays striking its forward lip is maximum. The occurrence of the maximum is due to intrinsic characteristics of the paraboloidal shape of the mirror.

Figure 3:
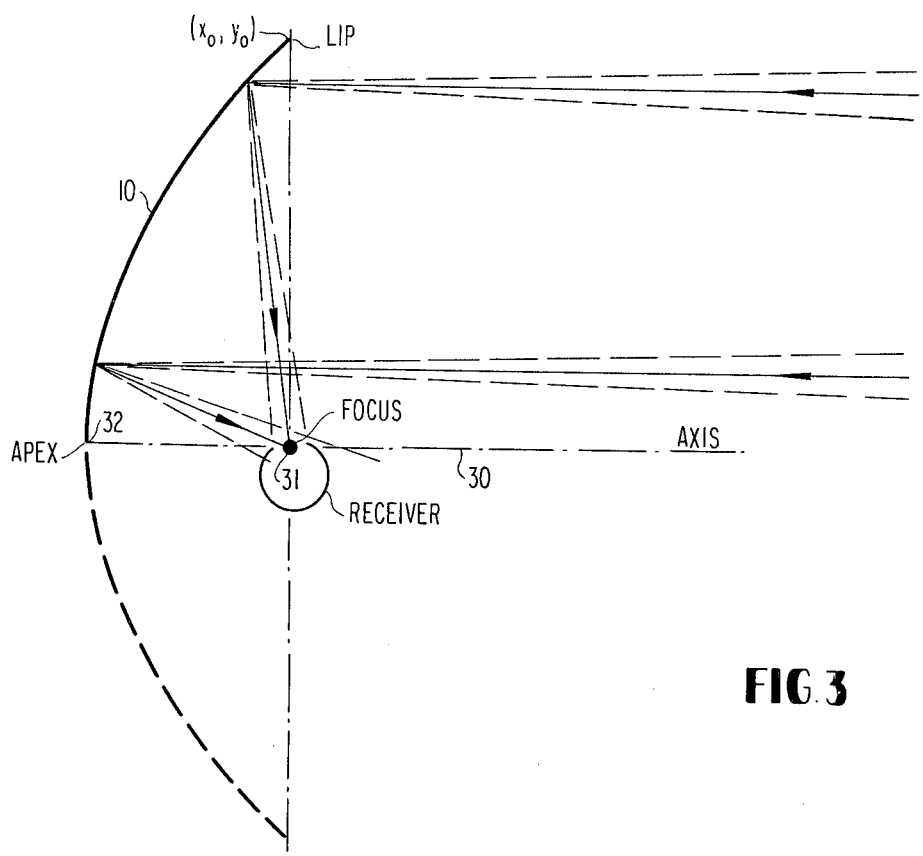
FIG. 3 is a schematic diagram of a parabolic trough concentrating solar collector having an optimized mirror configuration which maximizes the concentration ratio for rays reflected near the lip of the concentrator.

In short, the complete collection system after the first optimization discussed above, consists of the paraboloid mirror 10 (see FIG. 1), which, as shown in solid line in FIG. 3, commences at a first plane 30 passing through its focus 31 and apex 32, and which is truncated at a second plane which is orthogonal to the axis of the paraboloid and passes through focus 31, and a receiver located along the focal line. The entrance aperture to the receiver has width $W_o$, and said aperture lies in a plane that contains the optic axis and is centered on the focus 31, as shown in FIG. 3.

A second optimization in the optical design is also effected, and refers to rays for which the reflection point is not exactly at the entrance aperture of the mirror. If the reflection point is near, but not at, the lip of the paraboloid (see FIGS. 3 and 4), the solar image is smaller than $W_o$ because the distance from the reflection point to the focus 31 diminishes as one moves toward the apex 32 of the paraboloid. Since the angular spread of the rays is constant, the spatial spread at the focus is less. However, the aperture is fixed and it "points" at only one reflection point, i.e., its plane can be orthogonal to the central ray for only one reflection point. In the first optimization discussed above, it was considered that said one reflection point was $(x_o, y_o)$, at the lip of the paraboloid. In that case, rays that strike the paraboloid near its apex are presented with a foreshortened aperture as shown in FIG. 3. The second optimization minimizes this effect, and consists of tilting and enlarging the receiver aperture.

Figure 4:
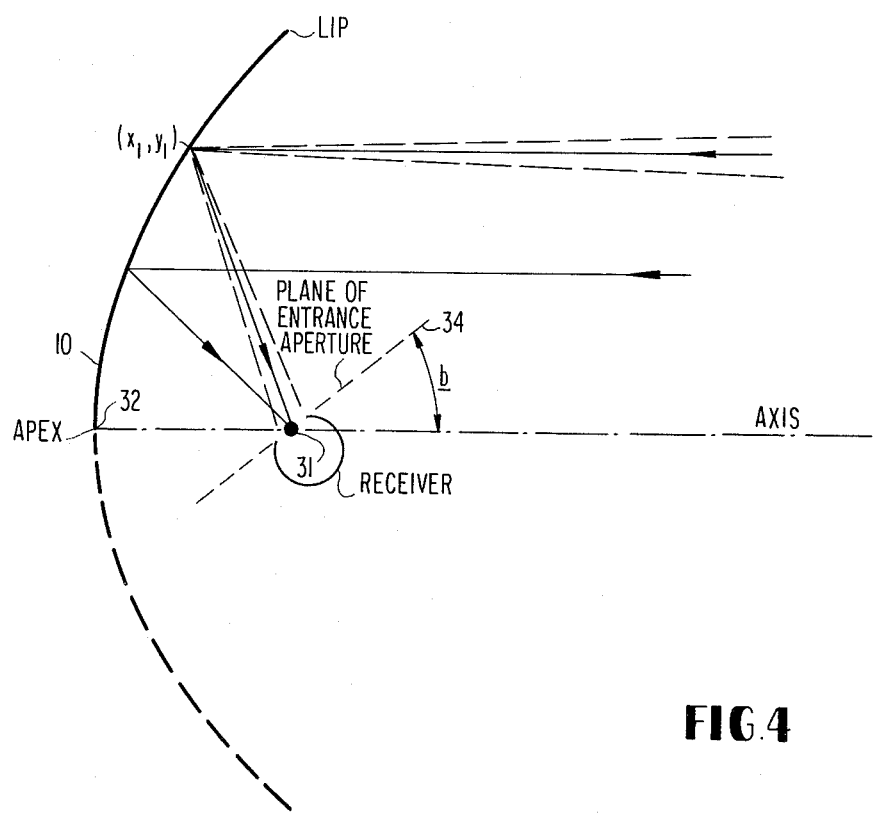
FIG. 4 is a schematic diagram of a parabolic trough collector having a tilted receiver aperture, representing a further optimization of the collector in accordance with the present invention.

An initial adjustment in the second optimization constitutes tilting the plane 34 of the receiver aperture as shown in FIG. 4. A pencil of rays is reflected at $(x_1, y_1)$. The receiver aperture has width $W_o$ and lies in a plane that passes through the focal line and is tilted by an angle b with respect to the optic axis. The width of the image, formed by rays reflected at $(x_1, y_1)$ and examined in the tilted plane 34, is $W_1$. The ratio of $W_1$ to $W_o$ is:

$$\frac{W_1}{W_o} = \frac{(1+B^2)^{\frac{1}{2}}(B+2Q-BQ^2)(Q^2+1)^2}{2[(Q^2-1)B-2Q]^2 - 2(\tan^2 a)[Q^2+2AQ-1]^2} \approx \frac{(1+B^2)^{\frac{1}{2}}(Q^2+1)^2}{2(B+2Q-BQ^2)}$$

where Q is the dimensionless parameter $Q = y_1/y_o$, $B = \tan b$, and S has been taken equal to $\frac{1}{2}$. If $W_1/W_o$ is less than or equal to one, all the rays in the image enter the receiver; otherwise some are lost.

Figure 5:
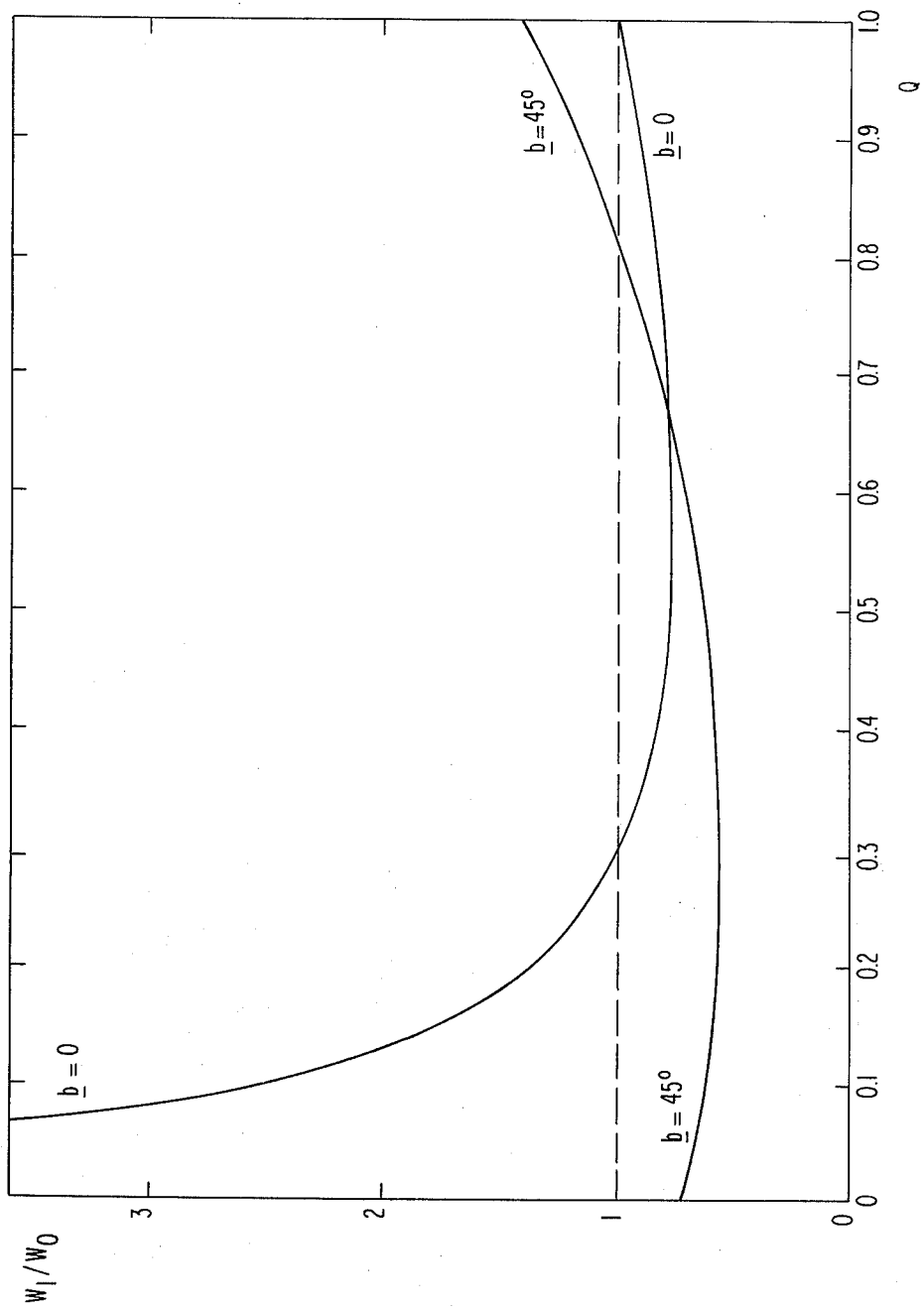
FIG. 5 is a graphical diagram which plots the ratio of image size, $W_1$, to receiver aperture width, $W_0$, as a function of the dimensionless parameter Q for two values of the aperture tilt angle b.
Figure 6:
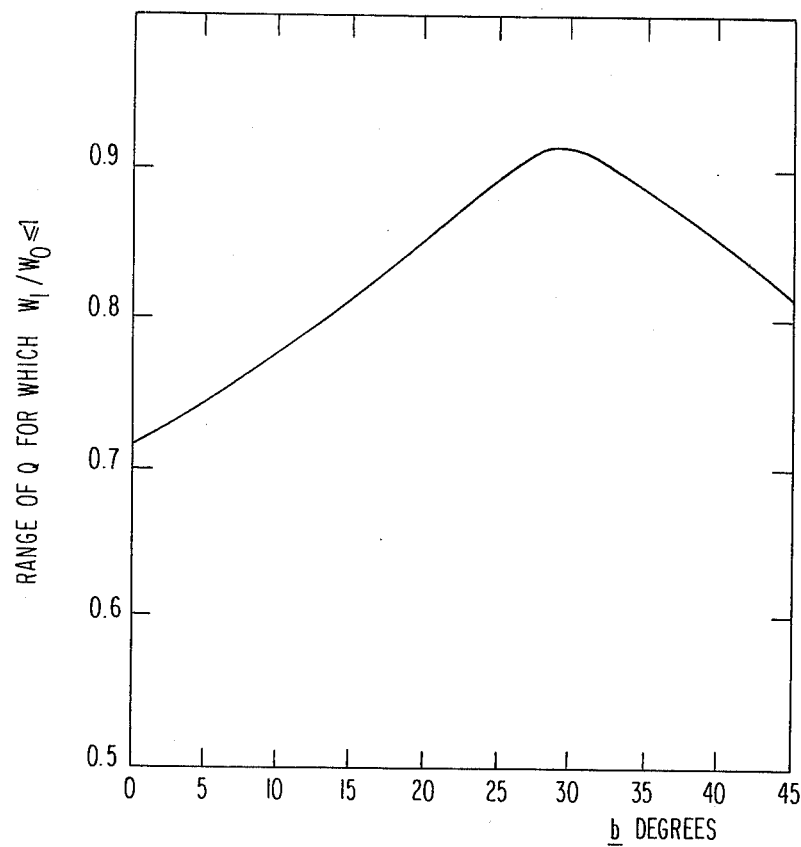
FIG. 6 is a graphical diagram showing the range of Q for which $W_1/W_0$ is less than 1, as a function of the receiver aperture tilt angle b.

The ratio $W_1/W_o$ is shown as a function of Q in FIG. 5. Note that for $B=0$ ($b=0°$), $W_1/W_o$ is less than one except for small values of Q, while for $B=1$ ($b=45°$), $W_1/W_o$ is less than one except for large values of Q. This suggests that for some intermediate value of b the range of Q, over which $W_1/W_o$ is less than one, may be maximum. The suggestion is correct, as shown in FIG. 6, which is plot of the range of Q for which $W_1/W_o$ is less than or equal to one, as a function of b. The maximum is 0.91 at $b=29°$. This means that for reflection points covering 91% of the mirror surface, no rays miss the receiver aperture. However, as will be apparent from FIG. 6, the 29° maximum is not a sharp maximum, and highly improved results are achieved for angles of b greater than and less than 29°, e.g., 29°±10°, substantially the range of 20°–40°.

The effects of tilting, discussed above, have been discussed with reference to a receiver aperture opening width that is equal to $W_o$. However, enlarging the receiver aperture opening, which constitutes a further adjustment in the second optimization, reduces the concentration ratio but avoids the loss of any rays at the lip and/or apex of the paraboloid. For the 29° optimum tilt, the maximum value of $W_l/W_o$ is 1.14 at $Q=1.0$. Thus if the receiver aperture opening is made $W'_o = 1.14 W_o$ in width, $W_l/W'_o$ is less than or equal to one for all Q, and essentially no rays are lost from any part of the paraboloid. After this adjustment is made, the collection ratio is 100 rather than 114.

The final configuration of a parabolic trough concentrating solar collector that includes all of the optimizations discussed above, is shown schematically in FIG. 7. The collector is optimized in the sense that it has maximum concentration ratio under the condition that no rays be lost from reflections at any point on the paraboloidal surface. It consists of a paraboloidal mirror whose surface extends from the apex of the paraboloid to the plane through the focus, and a receiver having a receiver entrance aperture that lies in a plane tilted 29° with respect to the optic axis as shown, said receiver entrance aperture having a width given by:

$$W'_o = 2.28 \, y_o \tan a.$$

The optimized parabolic trough concentrating collector discussed above is a building block for an array of tracking collectors. Two array geometries are shown schematically in FIG. 8. Although not illustrated, the receivers rotate with their associated reflectors. The receiver apertures are shown in FIG. 8 in the position they occupy when their associated reflectors are in the orientations shown in solid line.

Figure 7:
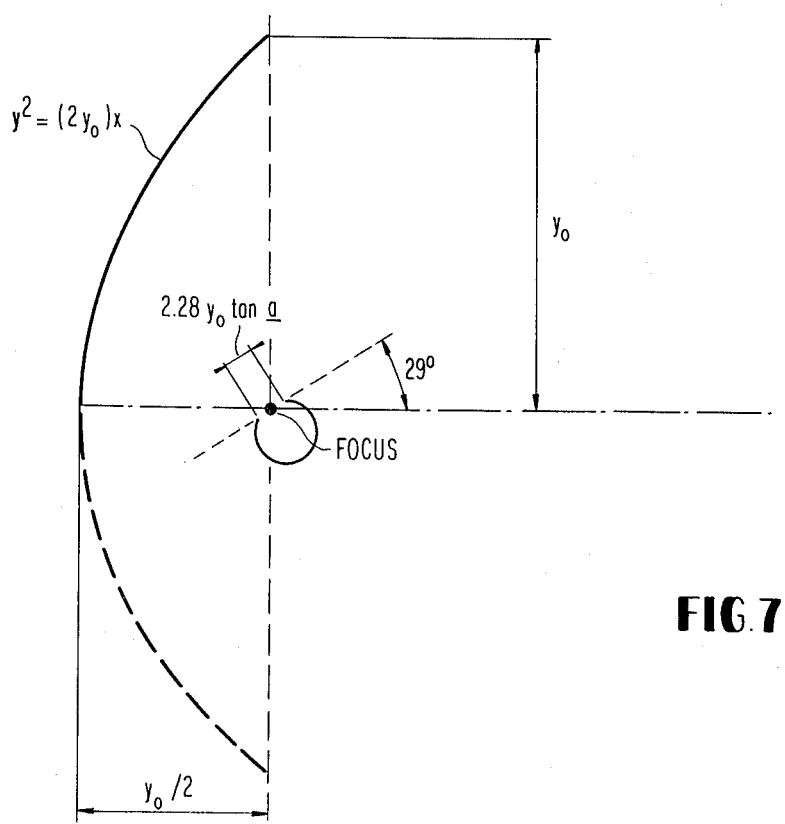
FIG. 7 is a schematic diagram of an optimized parabolic trough solar concentrator constructed in accordance with the present invention.

In the arrangement of FIG. 8a, half-paraboloids, e.g., of the type shown in FIGS. 1 and 7, are used. Alternatively, full paraboloids can be used as depicted in FIG. 8b. However, in this latter form of the invention, when both halves of the paraboloid are used, it is necessary to break the curve at the apex. An approximately flat area at that location (as designated in FIG. 8b) serves as a spacer, separating the two half-paraboloids by an amount approximately equal to the diameter of the receiver.

The configuration shown in FIG. 8b simplifies the fabrication of the mirror and uses half as many double size optics. The arrangement of FIG. 8a, on the other hand, has a simpler receiver design, with a single entrance aperture. In either geometry, tracking is accomplished by rotation of the mirror around the receiver as is shown in FIG. 1, with the mirrors and receiver apertures moving together. The tracking mechanisms can be standard devices. The receiver itself can take the form already described in reference to FIG. 1, or it can be a cylindrical black body or another type of receiver such as a photovoltaic device or a plate receiver.

Size scaling of the collectors to optimize a particular array geometry is readily done by varying a single parameter, $y_o$. The value of $y_o$ determines the shape of the paraboloid ($k = 2 y_o$) and its height ($x_o = y_o/2$). An advantage of the present invention is that the ratio of the collecting area to the mirror surface area is nearly as large as possible (0.87 compared to a maximum 1.0). The mirrors can be fabricated by any one of several known methods.

The optimized design of the present invention is relatively insensitive to fabrication errors such as inevitably occur, especially in low cost production. This characteristic of the invention will be more readily appreciated by considering two types of errors which may occur: a transverse displacement of the mirror surface in which the correct local slope is maintained, and a local slope error with no translation. For a translation by an amount d, the imaging error (defined as the difference between the point at which a ray crosses the axis and the point at which it would have crossed if the mirror were perfect) is given by D:

$$D = 2Sd$$

For a slope error of angular amount c, the error is given by:

$$D' = y_o \tan(2c)(4S^2 - 1)^2/(4S)^2$$

The effect of a mirror surface translation error is minimized by making S as small as possible. The effects of a slope error are minimized for $S = \frac{1}{2}$, which is the same value of S that was found to optimize the mirror configuration for maximum concentration ratio. Thus the optimizations which characterize the present invention exhibit the further advantages that the effect of slope errors is minimized and the effect of surface displacements is small. The configuration is accordingly forgiving of manufacturing imperfections.

While I have thus described preferred embodiments of the present invention, many variations will be apparent to those skilled in the art. It must therefore be understood that the foregoing description is intended to be illustrative only and not limitative of the present invention, and all such variations as are in accord with the principles described are meant to fall within the scope of the appended claims.

Having thus described my invention I claim:

1. A concentrating solar collector for use in a solar energy system, said collector comprising a radiation reflective surface having the configuration of a paraboloid of translation, said paraboloid defining a focal line that is spaced from the parabolic cross section of said surface and extends in a direction transverse to the axis of said parabolic cross section, one of the outermost extremities of said reflective surface being defined by an elongated lip that is positioned substantially in a plane passing through said focal line and oriented perpendicular to said axis, and means for supporting an elongated solar energy receiver along said focal line, said receiver having an elongated entrance aperture of fixed dimensions therein for admission of solar energy reflected by said surface, said entrance aperture being oriented at an angle to said axis, the plane of said entrance aperture being displaced from said axis by a fixed angle in the range of 20° to 40°.

2. The solar collector of claim 1 wherein said angle is substantially 29°.

3. The solar collector of claim 1 wherein another of the outermost extremities of said reflective surface passes through the apex of said parabolic cross section and lies in a plane disposed along said axis and disposed substantially parallel to said elongated lip.

4. The solar collector of claim 1 wherein the width of said entrance aperture is substantially equal to $2.28 y_o \tan a$, where $y_o$ is the distance between said lip and said axis, and a is the angular radius of the sun relative to said reflector.

5. The solar collector of claim 1 wherein said receiver includes a pair of said elongated entrance apertures spaced from one another, said surface comprising, in cross section, a pair of parabolic sections which are associated with said pair of apertures respectively and which are connected to one another adjacent the apices of said parabolic sections by an intervening flat region extending in a plane parallel to the focal lines of said sections.

6. The collector of claim 5 wherein said intervening flat region has a width substantially equal to the diameter of said receiver, the planes of said pair of apertures being oriented respectively in opposite angular directions relative to the axes of said parabolic sections.

7. The collector of claim 6 wherein the axial extent of each of said sections terminates substantially at a plane oriented perpendicular to the axis of said section and passing through the focal line of said section.

8. A concentrating solar collector for use in a solar energy system, comprising a radiation reflective surface which includes a pair of paraboloids, the axial extent of each said paraboloid being substantially confined between a first plane lying along the axis of the parabolic cross section of said paraboloid and passing through the apex of said paraboloid and a second plane oriented perpendicular to said axis and passing through the focus of said parabolic cross section, said collector including a solar energy receiver having a pair of elongated fixed entrance apertures therein which are oppositely disposed to one another and which are associated with said pair of paraboloids respectively, each of said apertures being disposed substantially along the focal line of an associated one of said paraboloids for the admission to said receiver of solar energy reflected by said paraboloid with the plane of said entrance aperture being disposed at an angle to said axis, and said pair of paraboloids being interconnected to one another adjacent their respective apices by an intervening elongated flat region which separates said apices from one another by a distance substantially equal to the diameter of said solar energy receiver.

9. The collector of claim 8 wherein said angle is substantially 29° ± 10°.

10. The collector of claim 9 wherein the width of each said entrance aperture is substantially equal to 2.28 $y_o \tan a$, where $y_o$ is the distance relative to the associated one of said paraboloids along said second plane between said axis and said paraboloid, and a is the angular radius of the sun relative to said paraboloid.

11. The collector of claim 10 wherein each said paraboloid is a paraboloid of translation.

* * * * *